April 12, 1966   J. W. IGOE ETAL   3,245,308
UTILIZING A SAMPLE TURNTABLE
Filed Feb. 28, 1963
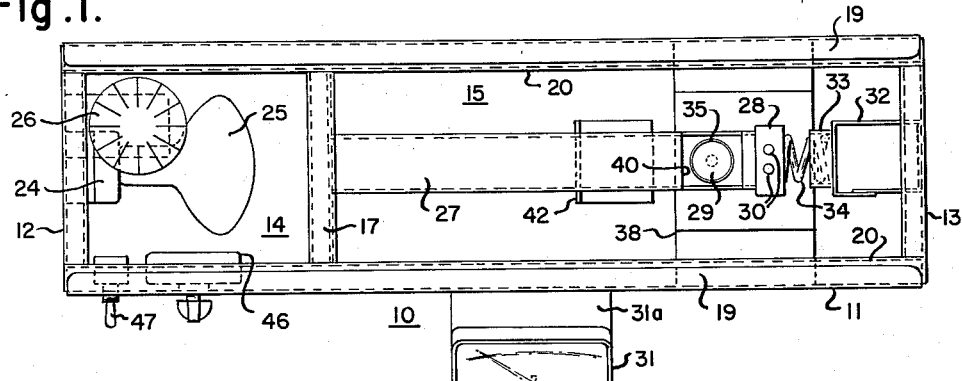
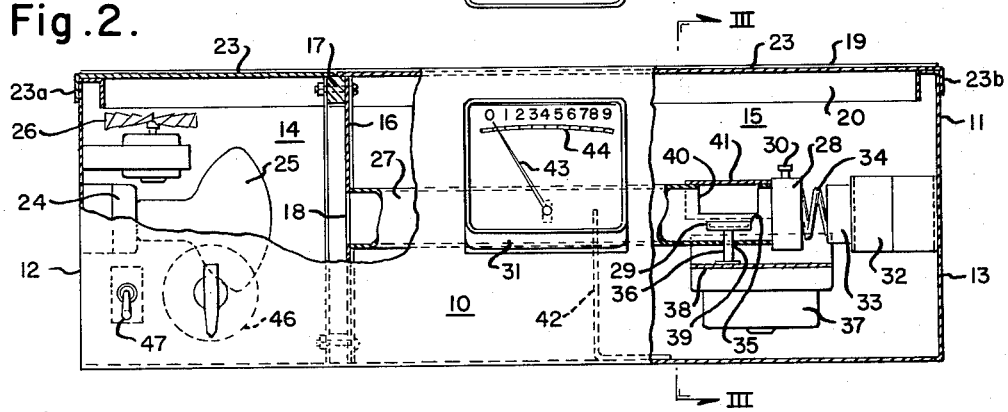
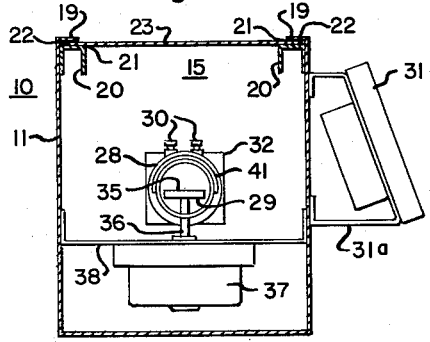
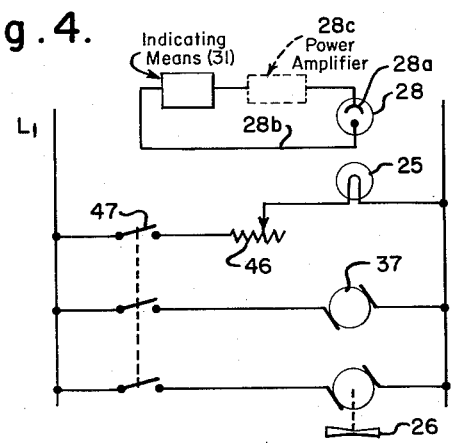
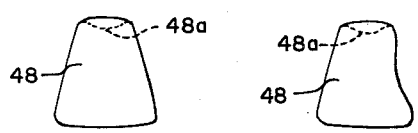
INVENTORS
John W. Igoe &
Edward A. Zawadzki

United States Patent Office 3,245,308
Patented Apr. 12, 1966

---

3,245,308
UTILIZING A SAMPLE TURNTABLE
John W. Igoe, Monroeville Borough, and Edward A. Zawadzki, Baldwin Borough, Pa., assignors to Bituminous Coal Research, Inc., Monroeville, Pa., a corporation of Delaware
Filed Feb. 28, 1963, Ser. No. 261,689
4 Claims. (Cl. 88—14)

This invention relates to area photometry for measurement of the cross-sectional area of an object, e.g., coke buttons produced to determine the free-swelling index of the coal or coals from which they were made. More particularly, this invention pertains to an area photometer and method for laboratories, testing and industrial plants to determine the cross-sectional area of specimens, especially of those which are irregularly shaped, substantially semiautomatically or automatically, utilizing photocell means or the equivalent.

As an example, in the standard method of tests for determining the free-swelling index of coals, it is appropriate to use the ASTM Designation D720 standard of the American Society for Testing Materials, or the corresponding test prescribed by a like body in another country. In the determination of such index, coke buttons are made in a silica crucible to make them swell if possible under the prescribed conditions of testing and, if so, to compare the area of the profile of the coke buttons so produced respectively with the so-called standard profiles, to which respective swelling index numbers are given, in that test. The comparison of the cross-sectional area of a coke button with one or more of the series of standard profiles requires rotation of the button and a visual comparison either with the standard profile or with the area thereof in the case of a button having a too unlike profile. Such comparison essentially depends upon the accuracy of the human eye, is time consuming and is subject to variations in "readings" depending upon the manner in which the button is rotated and/or whether or not there are different viewers.

Shortcomings of prior practices including those noted above are inhibited and/or eliminated in the instant invention. Therein, area photometer apparatus inclusive of photocell indicating means may be calibrated in terms of areas of standard profiles corresponding to swelling index numbers for coals, for example, to be tested in accordance with ASTM Designation D720 or the equivalent, and then such apparatus may be utilized for area measurement of the specimens for direct comparison, substantially without dependence upon the human eye, for ready ascertainment of the free-swelling index. The indicating means used with such photocell and other elements of the area photometer combination of this invention may be read directly, or used to operate a recorder. The embodiment of the invention illustrated in the drawings is also relatively inexpensive to construct, simple to operate and rapid and accurate in performance. Although described in terms herein of measuring coke buttons of coals for determination by photocell means of the area of the maximum cross-sectional area thereof, it is evident that the device is utilizable in laboratories and other places for relatively rapid and accurate determination of cross-sectional areas of other objects including the mean cross-sectional area of a specimen or object and/or the average cross-sectional area of a series thereof, or as a volume computation base. The invention is also utilizable with objects which are regular or irregular in profile and area.

Other objects, features and advantages of this invention will be apparent from the following description and the accompanying drawings, which are illustrative of one embodiment only, in which FIGURE 1 is a plan view, with the cover removed, of one embodiment of an area photometer of this invention utilizable, for example, in the determination of the free-swelling index of coal;

FIGURE 2 is a view of the embodiment shown in FIGURE 1 in front elevation with a portion of the casing and parts broken away to illustrate the construction thereof;

FIGURE 3 is a view taken along line III—III of FIGURE 2;

FIGURE 4 is a schematic wiring diagram which may be used in the operation of the illustrated embodiment of this invention;

FIGURE 5 is a view in elevation of a coke button specimen the area of which can readily and accurately be measured by the aforesaid embodiment; and FIGURE 6 is a view in elevation of the specimen shown in FIGURE 5 rotated through an angle of 90° about the vertical axis of such specimen.

Referring to FIGURES 1 to 3 of the drawings, one embodiment of an area photometer 10 of this invention is shown therein having a sheet metal box casing 11 extending from one end 12 longitudinally to the other end 13. The casing 11 is open at the top and suitably supported at the corners and ends where needed by angles or channels. Box 11 has a light source compartment 14 and a metering compartment 15 separated by a sheet partition 16 secured to one side of a rectangular frame portion 17, the partition 16 extending across the whole interior of the photometer box 11 except for a circular aperture 18 therethrough. The uppermost edges 19 of the front and back of box 11 are bent inwardly and horizontally so as to be spaced above longitudinally extending channels 20 immediately therebelow to provide substantially light-tight slide grooves 21 to receive the respective edges 22 of the sliding cover 23. Cover 23 may be in two portions, with turned-down ends 23a and 23b respectively, to cover the respective compartments 14 and 15 when the edges 22 are inserted in the grooves 21. The inner edges of the two cover portions when the cover is on meet/or overlap above the upper horizontal member 17 to insure substantial exclusion of light from the interior of box 10 when cover 23 is in place. Preferably, such interior is painted black, or otherwise made substantially non-reflective.

Compartment 14 is provided with a socket 24 mounted on the inside of the end wall 12 for a light source, here a 75-watt electric light bulb 25, of a standard construction to provide a relatively constant and rather intense light. If desired, the back wall and top cover portion of compartment 14 may be louvered for ventilation and cooling in that compartment, and a small electric fan 26 may be mounted therein to be automatically turned on whenever light bulb 25 is turned on.

Metering compartment 15 is provided with a tube 27 open at both ends, the end toward wall 12 terminating at partition 16 in registry with aperture 18. The light source 25 is juxtaposed to the partition opening 18 and orientated so that light rays entering the opening are substantially uniform across the area of the opening 18. The other end of tube 27 is covered by a photocell 28 of conventional construction so placed that light from source 25 passing into tube 27 will fall upon the light-sensitive element in photocell 28 save to the extent that such light is blocked by a specimen placed upon a support 29. Photocell 28, as shown, has a cylindrical holder which fits over the end of tube 27 toward wall 13 and is provided with a pair of terminals 30 which lead to an indicator 31 on the front of embodiment 10. Tube 27 extends longitudinally in alignment with the center of light source 25, aperture 18, photocell 28 and a sheet metal bracket 32. Bracket 32 is provided with a cuplike retainer 33 affixed thereto for retention of a spring 34 under suitable compression to hold cell 28 against the adjacent end of tube 27 and at the same time allow cell 28 to be readily removed therefrom by further compression of spring 34 as and when it is necessary to inspect or replace the cell. Embodiment 10 has its greater dimension between ends 12 and 13 and distances in that direction have been termed longitudinal herein even though in the course of use the indicator 31 is at the actual front of the device.

Support 29 is in the form of a turntable which may be provided with a slightly upturned peripheral edge 35. A downwardly extending spindle 36 extends from the turntable to a fractional horsepower motor and speed reducer 37 fastened to a shelf 38 extending from front to back of and fixed to casing 11 enclosing the device. Spindle 36 extends normally of the axis of tube 27 and through an opening 39 in the underside of tube 27 immediately beneath a semi-cylindrical opening 40 in the upper half of such tube immediately above turntable 29. The turntable 29, therefore, is disposed substantially parallel to light rays passing through tube 27. A semi-cylindrical cover 41 is provided for the outside of tube 27 to cover access opening 40 and overlap the edges thereof when in place after a specimen has been place on turntable 29, or removed therefrom. Preferably, turntable 29 is rotated at a slow speed, such as four and one-half r.p.m. so as not to throw a specimen off the turntable, or to one side thereof. Instead of flange 35, turntable 29 may be provided with upwardly extending pins for penetrable substances including coke buttons, in which case, if desired, faster rotation of the turntable could be provided, or a tacky adherent substance could be used on support 29. Another bracket 42 fixed to and extending from the bottom of the casing 11 to the underside of tube 27 may also be used for support and alignment thereof in device 10.

Indicator 31, as shown, is a milliammeter having a pointer 43 and scale 44. It can be affixed to the front of the casing 11 of the device 10 by brackets 31a. Indicator 31 would be calibrated for the photocell 28 with which it is to be used, as is readily understood, in order that scale 44 may, for example, be direct reading, in terms of corresponding swelling index numbers where the embodiment 10 is to be used for area measurement of coke buttons made, for example, under ASTM Designation D720. Thus, scale 44 for the particular cell 28 might have a reading extending between 0 and 9 depending upon the quantity of light which enters tube 27 and falls upon the light-sensitive element in cell 28 after passing whatever object, having an area profile to be measured, which may be in tube 27. The free-swelling index numbers 1 to 9 on scale 44 represent the ascending size range of coke buttons represented by those numbers under the above-designated test standard, although the scale may be provided with other designations, if desired, for the same or other tests and/or measurements.

Indicator 31 may also be a semi-recorder by the use of a maximum position arm with reset knob to be added to the meter 31 shown in the drawings for movement of the arm about the same pivot as point 43 and movable thereby so as to remain in the maximum position reached by pointer 43 in indicating the cross-sectional area of a specimen such as a coke button placed on turntable 29; such being particularly useful where a coke button, as in the case of the one shown in FIGURES 5 and 6, may have different cross-sections 90 angular degrees apart. In such last-mentioned situation, the maximum position arm would hold the maximum cross-sectional area position of the coke button in question as called for by the standard test, even though the pointer 43 moved back and forth somewhat across the scale as turntable 29 rotated. Otherwise, the operator would read the maximum position reached by needle 43 in determining the area of such irregular specimen, for test ASTM D720. Or, indicator means 31 may be a full recorder with amplifiers to amplify the signal from the terminals 30 in the course of use of the device to operate the recording pen or pens and chart for a more permanent record of the area measurement being made by device 10.

A schematic wiring diagram for an operation of embodiment 10 is illustrated in FIGURE 4. Therein, electrical current at suitable potential exists between the power lines L1 and L2 across which light source 25 is connected through a variable rheostat 46 to regulate the strength of the light source for the scale 44 calibration and an on-off switch 47, shown in the off position. Motor means 37 for turntable 29 is also connected across the power lines L1 and L2 through switch 47 so that motor 37 will operate when switch 47 is closed and will not operate when it is open; and the motor of fan 26 is connected across the power lines L1 and L2 in the same manner as motor 37. When the device 10 is operating, light from source 25 passes through tube 27 and falls upon the light-sensitive element 28a causing the production of emission current which passes through the circuit 28b to the indicating means shown. With milliammeter 31 no amplifier or battery booster normally is required, but the emission current from cell 28 may be passed through an amplifier 28c if a boost in power is required to actuate the indicating means such as might be the case either when there is a maximum position arm to be moved, or a pen recorder to be operated.

In operation, before switch 47 is turned on, a specimen, such as a coke button 48, to have its cross section measured, is placed on turntable 29 in the upright position, such as is shown in FIGURES 5 and 6. Cover 41 is placed over opening 40 and both parts of the cover 23, with edges 22 thereof in grooves 21, are slid into covering position closing the top of box 10. Rheostat 46 would have previously been turned to a selected position for the calibration of the swing of pointer 43 across scale 44 and markings in accordance with the intensity of the light source 25 used relative to the emission response thereto of sensitive element 28a. Hence, when switch 47 now is turned on, turntable 29 will slowly revolve and pointer 43 will swing to the right and slowly oscillate, for example, between the five and a half and six markings on scale 44 as the test index number for the respective cross-sectional areas of specimen 48 in elevations, as presented in FIGURES 5 and 6 (which are illustrative and not to scale), when normal to the axis of tube 27. This occurs because the amount of light blocked off from sensitive element 28a by specimen 48 gives a reading on indicator 31 conforming to its cross-sectional area. Even if there is a slight depression in the top 48a of specimen 48, it will not materially affect the reading and the free-swelling index number of the specimen 48 will be six in the profile list of ASTM Designation D720. Moreover, if the specimen were some other object, and the average cross-sectional area were needed, it would be easy to average the scale readings at the extremes of movement of the pointer 43 when a test is run. The completion of the measurement is over very quickly whereupon the lid portion 23b can be removed, cover 41 taken off, the specimen taken out and a new specimen or object to be measured placed on turntable 29, preferably after switch 47 has been turned off although such is not necessary, particularly in view of the slow rotation of turntable 29 in the illustrated embodiment.

Various changes may be made in respect of various elements in the combination of the illustrated embodiment and in the order of the method steps and other embodiments provided without departing from the spirit of this invention or the scope of the appended claims.

We claim:

1. An area photometer comprising, in combination, an elongated generally lightproof box having a light compartment and a metering compartment, said light compartment having a substantially constant light source therein positioned to direct light therefrom axially and uniformly toward said metering compartment, a partition generally separating said compartments, a tube open at both ends extending longitudinally in said metering compartment, said tube having one end extending to said partition and opening therethrough toward said light source, a discoidal photocell positioned substantially against and across the other end of said tube, a turntable for a specimen positioned within said tube adjacent said cell, said turntable having a spindle projecting normally through a wall portion of said tube and rotatably mounted relative thereto, said turntable disposed substantially parallel to light rays passing through said tube, means for rotating said spindle and turntable at a selected speed, a specimen passage aperture in a wall portion of said tube juxtaposed to said turntable, a cover for said tube for closing said aperture, resilient means mounted on the adjacent end of said box and engaging said cell to hold said cell against said other end of said tube, calibrated indicator means for electrically indicating the output of said photocell in terms of cross-sectional area of said specimen in the course of use of said photometer, and circuit means for connecting said indicator means to the output terminals of said cell.

2. An area photometer comprising, in combination, an elongated generally lightproof box having a light compartment and a metering compartment, said light compartment having a substantially constant light source therein, a partition generally separating said compartments, a tube extending longitudinally in said metering compartment, said tube having one end extending to said partition and opening therethrough toward said light source, a photocell extending substantially across said tube at a position along said tube spaced from said one tube end, a turntable for a specimen rotatably mounted within said tube between said cell and said one end of said turntable, said turntable being disposed substantially parallel to light rays passing through said tube, means for rotating said turntable at a selected speed about a rotative axis normal to said light rays, indicator means for electrically indicating the output of said photocell in the course of use of said photometer, and circuit means for connecting said indicator means to the output terminals of said cell.

3. An area photometer comprising an elongated generally light-proof box having a light compartment and a metering compartment, said light compartment having a substantially constant light source therein, a tube in said metering compartment open at the end thereof toward said light source, a photoelectric cell extending substantially across said tube at a position along said tube spaced from said tube end, a support to hold a specimen upright in said tube between said cell and said light source, said support being a turntable rotatably mounted within said tube and disposed generally parallel to the path of light rays therethrough, means for rotating said turntable at a predetermined speed, means for ventilating and cooling said light compartment, meter means for electrically indicating the output of said photocell in terms of cross-sectional area of said specimen in the course of use of said photometer, and circuit means for connecting said meter means to the output terminals of said cell.

4. An area photometer comprising an elongated generally light-proof box having a light compartment and a metering compartment, said light compartment having a substantially constant light source therein, means for regulating the intensity of light source, a tube in said metering compartment open at the end thereof toward said light source, a photoelectric cell extending substantially across said tube at a position along said tube spaced from said tube end, a support to hold a specimen upright in said tube between said cell and said light source, said support being a turntable rotatably mounted within said tube at a position between said light source and said cell, said turntable being disposed substantially parallel to the path of light rays through said tube and having its axis of rotation normal to said light rays, means for rotating said turntable at a preselected speed, circuit means including a switch for simultaneously controlling the energization of said light source and said rotating means, meter means for electrically indicating the output of said photocell in terms of cross-sectional area of said specimen in the course of use of said photometer, and additional circuit means for connecting said meter means to the ouput terminals of said cell.

References Cited by the Examiner

UNITED STATES PATENTS

| | | | |
|---|---|---|---|
| 2,531,529 | 11/1950 | Price | 250—218 |
| 2,578,882 | 12/1951 | Eash | 88—14 |
| 2,738,197 | 3/1956 | Stevens | 279—3 |
| 2,829,823 | 4/1958 | Fedder | 235—61 |
| 2,895,373 | 7/1959 | Eyrand | 88—14 |

JEWEL H. PEDERSEN, *Primary Examiner.*

RONALD L. WIBERT, *Examiner.*

E. S. BAUER, *Assistant Examiner.*